United States Patent
Greif et al.

(10) Patent No.: US 7,195,431 B2
(45) Date of Patent: Mar. 27, 2007

(54) CLAMPING DEVICE

(75) Inventors: Josef Greif, Friesenried (DE); Wolfgang Wenk, Kempten (DE)

(73) Assignee: Ott-Jakob GmbH & Co., Spanntechnik KG, Lengenwang (DE)

( * ) Notice: Subject to any disclaimer, the term of this patent is extended or adjusted under 35 U.S.C. 154(b) by 0 days.

(21) Appl. No.: 10/559,693

(22) PCT Filed: Sep. 9, 2004

(86) PCT No.: PCT/EP2004/010041

§ 371 (c)(1),
(2), (4) Date: May 4, 2006

(87) PCT Pub. No.: WO2005/035175

PCT Pub. Date: Apr. 21, 2005

(65) Prior Publication Data

US 2006/0251487 A1    Nov. 9, 2006

(30) Foreign Application Priority Data

Sep. 17, 2003   (DE) ............................... 103 42 951

(51) Int. Cl.
*B23C 5/26* (2006.01)
(52) U.S. Cl. .................. 409/233; 408/240; 279/900
(58) Field of Classification Search ................ 409/233, 409/232, 231; 408/239 R, 240, 239 A; 279/900, 279/2.11, 2.12
See application file for complete search history.

(56) References Cited

U.S. PATENT DOCUMENTS 4,997,325 A * 3/1991 Heel et al. .................. 409/233
5,827,021 A * 10/1998 Klement ..................... 409/233
5,860,776 A * 1/1999 Sato et al. .................. 409/233
6,287,059 B1 * 9/2001 Hashidate et al. .......... 409/233

(Continued)

FOREIGN PATENT DOCUMENTS

DE      10159611 C      5/2003

(Continued)

*Primary Examiner*—Erica Cadugan
(74) *Attorney, Agent, or Firm*—Martin Fleit; Paul D. Bianco; Fleit Kain Gibbons Gutman Bongini & Bianco, P.L.

(57) ABSTRACT

The invention relates to a device for clamping a hollow shaft tool (1) or tool holder provided with a conical hollow shaft (3) in a machine spindle (2) provided with a taper bore (4), especially for use in a machine tool. The device comprises a clamping sleeve (7), axially displaceable inside the machine spindle (2), a tow-rod (8) for displacing the clamping sleeve (7) and being movable between a release position and a clamping position, and a plurality of pincer elements (19) associated with the clamping sleeve (7). The pincer elements are radially displaced by the displacement of the clamping sleeve (7) and have clamping faces (21, 24) to be placed on a conical inner surface (22) of the conical hollow shaft (3) and an opposite surface (26) on the work spindle (1). The aim of the invention is to provide a clamping device of the aforementioned kind wherein the hollow shaft tool is reliably retained in the machine spindle even when the tow-bar is already released. For this purpose, the clamping sleeve (7) can be axially displaced relative to the tow-bar (8) and is axially biased by a compression spring (14) against the motion of release of the tow-bar (8).

12 Claims, 3 Drawing Sheets

U.S. PATENT DOCUMENTS

Figure 1:
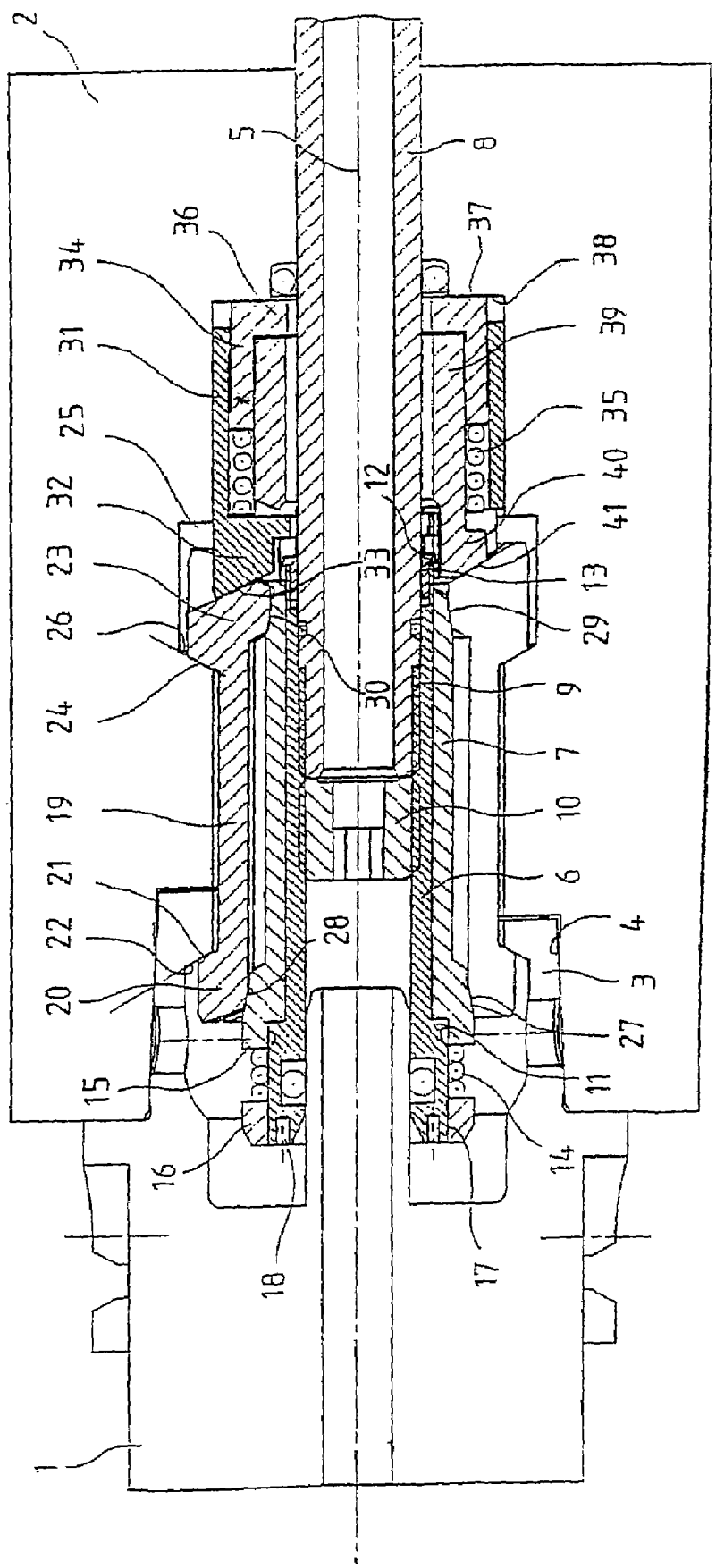

| | | |
|---|---|---|
| 6,419,430 B2 * | 7/2002 | Hangleiter .................. 409/233 |
| 6,436,021 B2 * | 8/2002 | Nukui ........................ 409/233 |
| 6,481,940 B2 | 11/2002 | Prust et al. |
| 6,568,888 B2 * | 5/2003 | Hangleiter .................. 409/233 |
| 6,568,889 B2 * | 5/2003 | Rohm ........................ 409/233 |
| 6,923,605 B2 * | 8/2005 | Jakob et al. ................ 409/233 |

FOREIGN PATENT DOCUMENTS

JP          8-174315 A   *   7/1996

* cited by examiner

CLAMPING DEVICE

The invention relates to a clamping device for clamping a hollow shaft tool or tool holder provided with a conical hollow shaft in a machine spindle provided with a taper bore, especially for use in a machine tool.

A clamping device of this type is known from DE 101 59 611 C1. Here, a clamping bushing is disposed within a machine spindle that is provided with a taper bore so that it can be displaced by means of a tow-bar, wherein several pincer elements are spaced apart from one another in the circumferential direction and adjoin the outside of said clamping bushing. The front ends of these pincer elements have oblique first clamping faces that are designed to adjoin corresponding oblique clamping faces of the hollow shaft tool; the rear ends of the pincer elements have oblique second clamping faces that are designed to adjoin a corresponding opposite surface of the machine spindle. When the clamping bushing is axially displaced, the pincer elements are displaced radially outward or inward in a parallel position relative to the central axis of the machine spindle such that the hollow shaft tool is respectively clamped in position or released. In order to ensure that the hollow shaft tool is also reliably retained and secured from falling out when the pincer elements are released, an additional clamping sleeve with radially resilient clamping segments for frictionally engaged fixing of the holding pincers is disposed within the machine spindle in this known clamping device. However, such an additional clamping sleeve increases the fabrication and installation costs.

The invention is based on the problem of developing a clamping device of the initially described type that makes it possible also to reliably retain the hollow shaft tool in the machine spindle when the tow-bar is already released without requiring an additional clamping sleeve.

This problem is solved by the clamping device with the characteristics of the present invention.

In the clamping device according to the invention, the clamping sleeve can be axially displaced relative to the tow-bar and is axially biased by a compression spring against the motion of release of the tow-bar. When the tow-bar is displaced into the release position, the clamping sleeve is prevented from participating in the entire axial movement of the tow-bar since the compression spring holds the clamping sleeve in a position in which the pincer elements, actuated by the clamping sleeve are still engaged with the conical inner surface of the conical hollow shaft with a small region of their clamping faces. In this position, the hollow shaft tool is still retained within the machine spindle although the tow-bar is already located in the release position. Consequently, the actuating mechanism for releasing the clamping device can already be activated before an automatic tool changing apparatus engages on the hollow shaft tool. This makes it possible to reduce the tool change-over time. In the clamping device according to the invention, the pincer elements carry out an axial and radial stroke relative to the machine spindle rather than a pivoting movement. This makes it possible to realize a retention area instead of merely a retention point. Such a retention area makes it possible to slow the acceleration of the tool during its expulsion.

In a practical embodiment of the invention, the clamping bushing is displaceably guided on an ejection sleeve that is rigidly connected to the tow-bar. This ejection sleeve may be connected to the tow-bar by means of screws or other suitable means.

The clamping sleeve preferably can be displaced relative to the ejection sleeve between an annular shoulder on the ejection sleeve and a rear annular collar of a reducer mounted on the rear end of the ejection sleeve.

In one advantageous embodiment, the compression spring is braced between the front face of the clamping sleeve and a biasing nut on the front end of the ejection sleeve. The spring force consequently can be varied by adjusting the biasing nut, and the tool withdrawing force can be externally adapted to user requirements.

Figure 2:
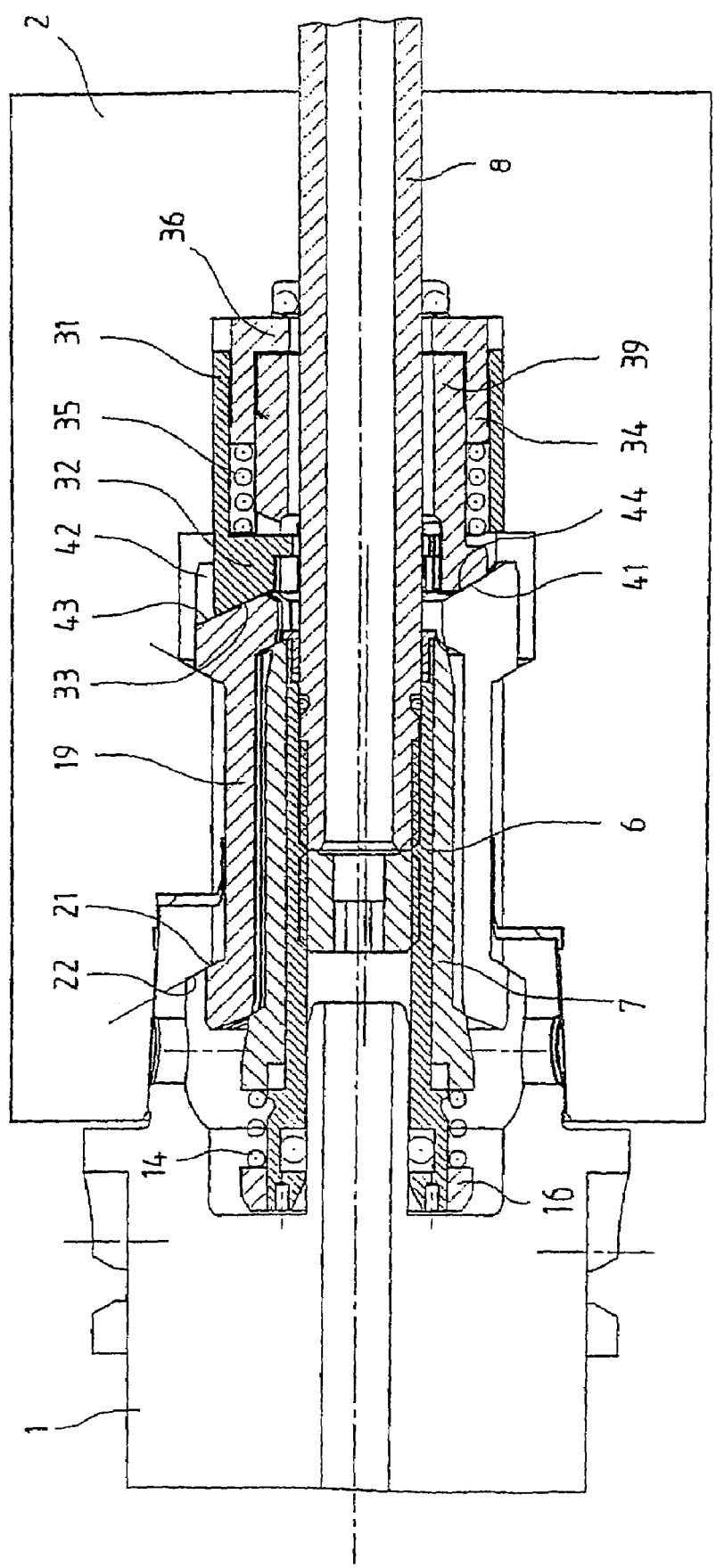

Other distinctive features and advantages of the invention are discussed in the following description of a preferred embodiment in reference to the drawing. It shows:

FIG. 1, a clamping device according to the invention in a clamping position;

FIG. 2, the clamping device according to FIG. 1 in a retaining position, and

Figure 3:
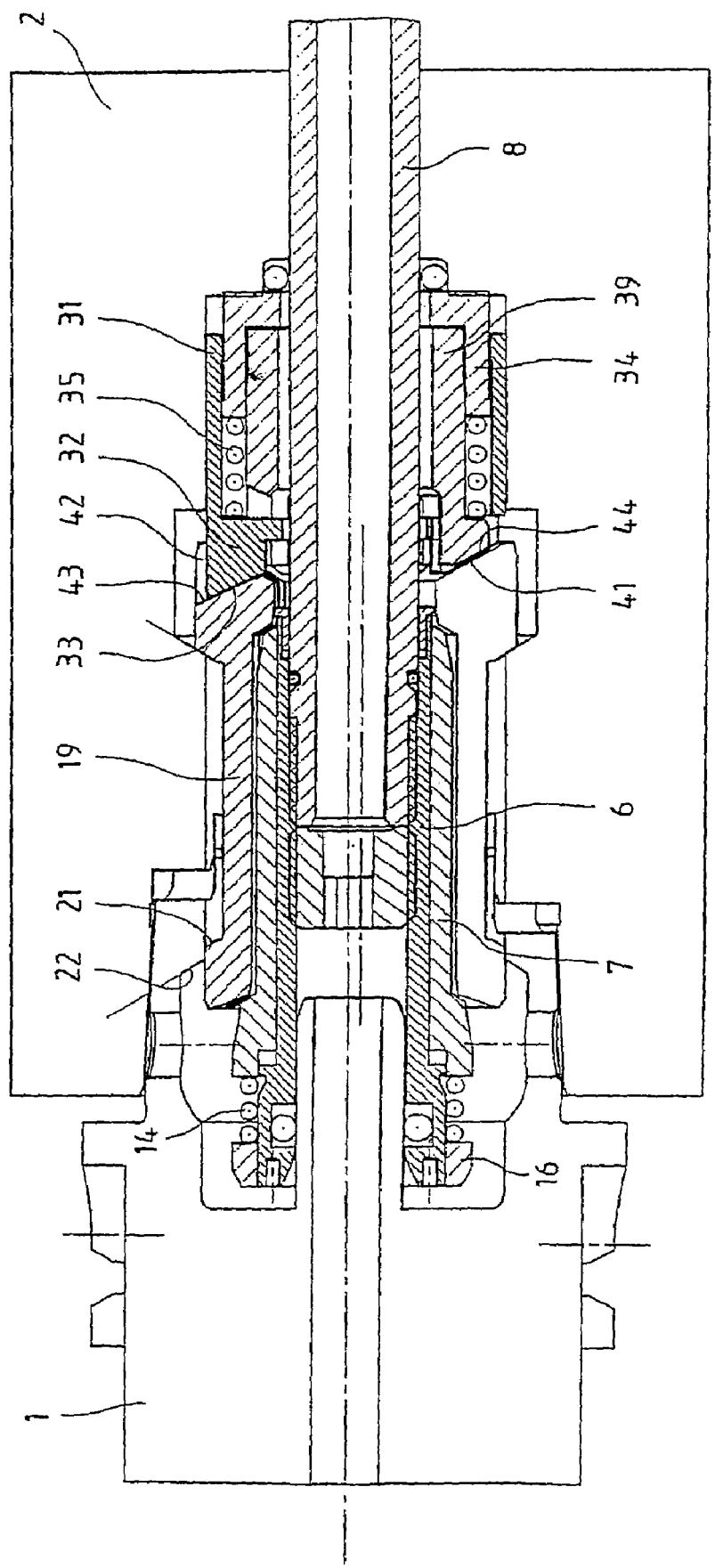

FIG. 3, the clamping device according to FIG. 1 in a tool-changing position.

FIGS. 1–3 respectively show longitudinal sections through a clamping device for clamping a hollow shaft tool 1 in the machine spindle 2 of a machine tool in a clamping position, a retention position and a tool-changing position. The hollow shaft tool 1 has a conical hollow shaft 3 that engages with a corresponding taper bore 4 on the front end of the hollow, cylindrical machine spindle 2.

The clamping device comprises an ejection sleeve 6 that is arranged within the machine spindle 2 concentric to its central axis 5, with a clamping sleeve 7 being guided on said ejection sleeve in an axially displaceable fashion. The ejection sleeve 6 is mounted on the front end of a tow-bar 8 that is biased rearward (toward the right in FIG. 1) by means of a not-shown spring arrangement and can be displaced opposite to the spring arrangement by means of a not-shown actuating device in the direction of the hollow shaft tool 1. On its front end that faces the hollow shaft tool 1, the tow-bar 8 is provided with threads 9, onto which the ejection sleeve 6 is screwed. The ejection sleeve 7 [sic; 6] is axially secured on the tow-bar 8 with an additional counter screw 10. The clamping sleeve 7 is guided on the ejection sleeve 6 such that it can be axially displaced between a front annular shoulder 11 and a rear collar 12 of a reducer 13 that is mounted on the rear end of the ejection sleeve 6. In the embodiment shown, the reducer 13 is screwed, for example, into the rear side of the ejection sleeve 6 with the aid of the corresponding threads. The compression spring 14 biases the clamping sleeve 7 rearward relative to the ejection sleeve 6. The compression spring 14 is braced between the front face 15 of the clamping sleeve 7 and a biasing nut 16 that is screwed onto the external threads 17 on the radially widened front end of the ejection sleeve 6. The bias can be varied by adjusting the biasing nut 16. Axial bores 18 for a corresponding tool are arranged on the face of the ejection sleeve 6 in order to steady the ejection sleeve 6 during the adjustment of the biasing nut 13.

The outside of the clamping sleeve 6 [sic; 7] is adjoined by several pincer elements 19 that are equidistantly separated in the circumferential direction and extend parallel to the central axis 5 of the machine spindle 2. The front ends of the pincer elements 19 that point toward the conical hollow shaft 3 have a radial thickening 20 with a first clamping face 21 that is respectively formed by a conical surface segment. In the clamping position shown in FIG. 1, this clamping face 21 adjoins a conical inner surface 22 inside the conical hollow shaft 3. The conical inner surface 22 has an angle of inclination relative to the longitudinal axis of the conical hollow shaft 3 that corresponds to the relative angle of inclination of the first clamping face 21 of the pincer elements 19. The rear ends of the pincer elements 19 also have a thickening 23 with a second clamping face 24 that is inclined opposite to the first clamping face 21 and serves to support the pincer elements 19 on a conical opposite surface 26 that is arranged within an annular groove 25 of the machine spindle 2. The second clamping face 24 of the pincer elements 19 is also formed by a conical surface segment and has an angle of inclination that corresponds to the inclination of the opposite surface 26.

On the outside of its front end that faces the conical hollow shaft 3, the clamping sleeve 7 has first conical clamping surface areas 27 that are respectively adjoined by a corresponding inner surface 28 on the front end of the pincer elements 19. Second conical clamping surface areas 29 are also provided on the outside of the rear end of the clamping sleeve 7. The second conical clamping surface areas are respectively adjoined by a corresponding inner surface 30 on the rear end of the pincer elements 19. The clamping surface areas 27 and 29 of the clamping sleeve 7 and the corresponding inner surfaces 28 and 30 of the pincer elements 19 are adapted to one another in such a way that an axial displacement of the clamping sleeve 7 causes the pincer elements 19 to be displaced radially outwardly or inwardly in a parallel position relative to the central axis 5 of the machine spindle 2.

A spacer which is arranged within the machine spindle 2 adjacent to the rear ends of the pincer elements 19 and is not described in further detail, serves to separate the pincer elements 19 by a predetermined distance in the circumferential direction. On the end that faces the pincer elements 19, the spacer comprises a radially outer holder 31, which is realized in the form of a bushing and comprises several axially protruding extensions 32 with beveled faces 33 that are equidistantly separated in the circumferential direction. The holder 31 can be displaced on a bushing 34 and is mounted such that it is acted upon in the direction of the pincer elements 19 by a compression spring 35. On its rear end, the bushing 34 has an annular shoulder 36 and adjoins an annular surface 38 inside the machine spindle 2 with its rear face 37. A sleeve 39 is arranged within the bushing 34 concentric to its longitudinal axis and adjoins the annular shoulder 36 with its rear face. On its front end, this sleeve comprises several ring segments 40 with beveled contact surfaces 41 that are separated from one another in the circumferential direction and protrude between the extensions 32 of the holder 31.

According to FIG. 2, the extensions 32 of the holder 31 engage in a groove 42 on the rear end of the pincer elements 19 and their beveled faces 33 adjoin a correspondingly beveled opposite surface 43 in the base of the groove 42. The beveled contact surfaces 41 of the sleeve 39 adjoin a bevel 44 on the rear end of the pincer elements 19. This bevel 44 is inclined opposite to the beveled opposite surface 43.

The function of the above-described clamping device is discussed below:

In the clamping position shown in FIG. 1, the ejection sleeve 6 is pressed into the retracted position shown by the tow-bar 8 and a—not-shown—spring arrangement in the form of a disk spring assembly. In this position, the clamping sleeve 7 adjoins the front annular shoulder 11 of the ejection sleeve 6, and the compression spring 14 is in the compressed state. The pincer elements 19 are pressed radially outward in this position by the clamping sleeve 7 such that the clamping faces 21 and 24 are respectively engaged with the conical inner surface 22 on the conical hollow shaft 3 and the opposite surface 26 in the machine spindle 2. The hollow shaft tool 1 is thereby retained under tension in the machine spindle 2.

In order to release the clamping device, the ejection sleeve 6 is displaced from the clamping position shown in FIG. 1 in the direction of the hollow shaft tool 1 until it reaches the position shown in FIG. 2, with the aid of the tow-bar 8 that is actuated, e.g., by means of a hydraulic piston or another suitable actuating mechanism. The forward movement of the ejection sleeve 6 also causes the clamping sleeve 7 to be displaced in the direction of the hollow shaft tool 1. During this process, the pincer elements adjoining the outside of the clamping sleeve 7 are moved radially inward. However, the clamping sleeve 7 that is displaceably guided on the ejection sleeve 6 does not participate in the entire axial movement of the ejection sleeve 6 because it is held in the retaining position shown in FIG. 2 by the compression spring 14. In this retaining position, the pincer elements 19 adjoining the outside of the clamping sleeve 7 are displaced radially inward to such a degree that only small areas of their clamping faces 21 are still engaged with the conical inner surface 22 and the inside of the conical hollow shaft 3. In this position, the hollow shaft tool 1 is still retained within the machine spindle 2 although the ejection sleeve 6 and the tow-bar 2 as well as their actuating mechanism are already in the release position.

When the hollow shaft tool 1 is pulled out of the machine spindle 2 in this position, e.g., by an automatic tool changing apparatus, the pincer elements 19 are additionally displaced radially inward such that the clamping sleeve 6 [sic; 7] is transferred from the retaining position shown in FIG. 2 into a tool changing position that is shown in FIG. 3 against the force of the compression spring 14. In this position, the pincer elements 19 adjoining the outside of the clamping sleeve 7 are displaced radially inward to such an extent that the clamping faces 21 are disengaged from the conical inner surface 22 inside the conical hollow shaft 3 and the hollow shaft tool 1 can be easily withdrawn.

The actuating mechanism for releasing the clamping device consequently can already be activated before an automatic tool changing apparatus engages with the hollow shaft tool 1. This makes it possible to reduce the tool change-over time.

The invention claimed is:

1. Device for clamping a hollow shaft tool or a tool holder provided with a conical hollow shaft in a machine spindle having a rotational axis and provided with a taper bore, for use in a machine tool, with a clamping sleeve that can be axially displaced within the machine spindle, with a tow-bar that can be displaced between a release position and a clamping position and that serves to displace the clamping sleeve, and with a plurality of pincer elements that are assigned to the clamping sleeve and that can be displaced radially due to displacement of the clamping sleeve, where said pincer elements have clamping faces for adjoining a conical inner surface of the conical hollow shaft and for adjoining an opposite surface on the machine spindle, characterized in that the clamping sleeve can be axially displaced relative to the tow-bar and is axially biased in a direction opposite to a direction of the release movement of the tow-bar by a compression spring.

2. Device according to claim 1, characterized in that the clamping sleeve is displaceably guided on an ejection sleeve that is rigidly connected to the tow-bar.

3. Device according to claim 2, characterized in that the ejection sleeve is screwed onto threads on a front end of the tow-bar.

4. Device according to claim 3, characterized in that the ejection sleeve is secured on the tow-bar with an additional locking screw.

5. Device according to claim 1 characterized in that the clamping sleeve can be displaced between a front annular shoulder and a rear annular collar.

6. Device according to claim 5, characterized in that the front annular shoulder is disposed on an ejection sleeve and in that the rear annular collar is disposed on a reducer mounted on a rear end of the ejection sleeve.

7. Device according to claim 1, characterized in that the compression spring is braced between a front face of the clamping sleeve and a biasing nut.

8. Device according to claim 7, characterized in that the biasing nut is screwed onto external threads on a front end of an ejection sleeve.

9. Device according to claim 1, characterized in that the pincer elements are separated from one another in the circumferential direction of the spindle by means of a spacer.

10. Device according to claim 9, characterized in that the spacer comprises a radially outer holder that is realized in the form of a bush and has beveled faces on axially protruding extensions in order to adjoin beveled opposite surfaces on a rear side of the pincer elements.

11. Device according to claim 10, characterized in that the holder is acted upon in a longitudinal direction of the pincer elements by a further compression spring.

12. Device according to claim 10, characterized in that the spacer also comprises an inner sleeve that is realized concentric to the holder and comprises a plurality of ring segments that are separated from one another in the circumferential direction of the spindle and protrude between the extensions of the holder, where said ring segments have beveled contact surfaces for adjoining a bevel of the pincer elements.

* * * * *